(12) United States Patent
Garret et al.

(10) Patent No.: US 9,764,708 B2
(45) Date of Patent: Sep. 19, 2017

(54) AIRBAG MODULE

(71) Applicants: Gilles Garret, Rouen (FR); Olivier Richez, Rouen (FR)

(72) Inventors: Gilles Garret, Rouen (FR); Olivier Richez, Rouen (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/036,850

(22) PCT Filed: Dec. 3, 2014

(86) PCT No.: PCT/SE2014/051439
§ 371 (c)(1),
(2) Date: May 16, 2016

(87) PCT Pub. No.: WO2015/084242
PCT Pub. Date: Jun. 11, 2015

(65) Prior Publication Data
US 2016/0272142 A1    Sep. 22, 2016

(30) Foreign Application Priority Data
Dec. 5, 2013 (DE) .......................... 10 2013 225 053

(51) Int. Cl.
*B60R 21/207* (2006.01)
*B60R 21/217* (2011.01)
(Continued)

(52) U.S. Cl.
CPC ............ *B60R 21/207* (2013.01); *B60R 21/20* (2013.01); *B60R 21/205* (2013.01); *B60R 21/215* (2013.01); *B60R 21/217* (2013.01)

(58) Field of Classification Search
CPC ........................... B60R 21/207; B60R 21/217
See application file for complete search history.

(56) References Cited

U.S. PATENT DOCUMENTS 5,799,971 A * 9/1998 Asada .................... B60R 21/207
                                                                    280/728.3
5,924,724 A * 7/1999 Nakamura ............ B60R 21/207
                                                                    280/730.1
(Continued)

FOREIGN PATENT DOCUMENTS

| EP | 2617606 A1 | 7/2013 |
|---|---|---|
| JP | 2000-016224 A | 1/2000 |
| JP | 2010-184668 A | 8/2010 |

OTHER PUBLICATIONS

Isaji et al., Airbag Device, Jan. 18, 2000, JPO, JP 2000-016224 A, Machine Translation of Description.*
(Continued)

*Primary Examiner* — James A English
(74) *Attorney, Agent, or Firm* — Stephen T. Olson; Harness, Dickey & Pierce, P.L.C.

(57) ABSTRACT

An airbag module includes an inflatable folded or rolled airbag, a gas generator for inflating the airbag. The airbag module includes a metallic bracket with a U-shaped cross section, which embraces the folded or rolled airbag, and which includes at least two attachment points for an attachment of the airbag module at two distanced attachment points at a vehicle fixed structure. The metallic bracket is designed to be attached with facing the open space between two opposing legs of the U-shaped cross section towards the interior of the vehicle.

15 Claims, 2 Drawing Sheets

(51) Int. Cl.
  *B60R 21/20* (2011.01)
  *B60R 21/205* (2011.01)
  *B60R 21/215* (2011.01)

(56) References Cited

U.S. PATENT DOCUMENTS

| | | | | |
|---|---|---|---|---|
| 6,050,636 A * | 4/2000 | Chevallier | ............ | B60N 2/5825 280/728.1 |
| 6,213,498 B1 * | 4/2001 | Ghalambor | ............ | B60R 21/207 280/728.2 |
| 6,513,828 B2 * | 2/2003 | Aulbach | ................ | B60R 21/207 280/728.3 |
| 7,267,363 B2 * | 9/2007 | Tredez | .................. | B60R 21/207 280/728.3 |
| 7,281,735 B2 * | 10/2007 | Acker | .................. | B60N 2/5841 280/728.2 |
| 8,505,961 B2 | 8/2013 | Jakobsson | | |
| 8,636,300 B2 | 1/2014 | Jaconelli et al. | | |
| 8,752,861 B2 | 6/2014 | Fukawatase et al. | | |
| 8,857,849 B2 | 10/2014 | Malmenstam et al. | | |
| 2004/0239081 A1 * | 12/2004 | Tredez | .................. | B60R 21/207 280/728.2 |
| 2006/0061073 A1 | 3/2006 | Naruse et al. | | |
| 2013/0015640 A1 | 1/2013 | Lusk et al. | | |
| 2013/0175792 A1 | 7/2013 | Fukawatase et al. | | |
| 2013/0200599 A1 * | 8/2013 | Shamoto | ................ | B60N 2/289 280/730.2 |
| 2014/0008898 A1 * | 1/2014 | Tracht | .................. | B60R 21/207 280/728.2 |
| 2014/0183846 A1 * | 7/2014 | Fujiwara | ............... | B60R 21/207 280/729 |
| 2015/0283970 A1 * | 10/2015 | Line | ......... | B60N 2/58 280/728.3 |
| 2016/0009247 A1 * | 1/2016 | Fujiwara | ............. | B60R 21/2171 280/728.2 |
| 2016/0159305 A1 * | 6/2016 | Makita | .................. | B60R 21/207 280/728.2 |

OTHER PUBLICATIONS

International Search Report and Written Opinion of the ISA for PCT/SE2014/051439, ISA/SE, Stockholm, dated Mar. 10, 2015.

* cited by examiner

AIRBAG MODULE

CROSS-REFERENCE TO RELATED APPLICATIONS

This application is a 371 U.S. National Stage of International Application No. PCT/SE2014/051439, filed Dec. 3, 2014, which claims the benefit of and priority to German Patent Application No. 102013225053.5, filed Dec. 5, 2013. The entire disclosures of the above applications are incorporated herein by reference.

FIELD

The invention relates to an airbag module comprising the features of the preamble of claim 1.

BACKGROUND

Airbag modules are known from different applications in a vehicle. The airbag module comprises a gas generator and a folded or rolled airbag, which is inflated by the gas generated by the gas generator. Furthermore the airbag module comprises a container in which the airbag is folded or rolled to fix the airbag in a predetermined geometry after the folding. Furthermore the container is used also to attach the airbag module at the vehicle structure. The gas generated by the gas generator is deflected by a deflector into the airbag, wherein the deflector is attached at the container. The airbag module is preassembled and attached at the vehicle as a module. Especially when the airbag module is a seat integrated airbag module, the available space is very limited. Therefore all parts of the airbag module need to be designed in a space efficient manner. Furthermore all parts, including the vehicle structure, should be also as light as possible because of the general requirement of less fuel consumption.

To fulfill both requirements the container and/or the vehicle structure or the seat structure where the airbag module is attached was made of resin with a high stiffness. If the stiffness of the attachment structure or of the container should be further increased the design is problematic as the limited available space would not allow any rips or another geometry increasing the stiffness of the airbag module.

US Publication No. 2013/0015640 reveals an airbag module without container that can be mounted to a resin seat frame mentioned above. In this solution, a molded plastic cover with a so called Class A surface is connected to a base plate. The base plate is made of metal or high-strength plastic. The base plate is formed in a U-shape, wherein one end of the base plate connects the airbag module with the seat structure. Additionally, the gas generator is connected to the base plate.

In modern vehicles light weight structure elements like seat frames out of resin, e.g. CFRP or GRP, are used which can be shaped in complex geometries. Therefore the structure element might be provided already in the basic structure with an attachment surface adapted to the airbag module. Nevertheless the advantage of using light weight structure elements might be in this case disadvantageous as the stiffness of these parts might be too low especially to support the airbag when it is inflated.

SUMMARY

Therefore it is the object of the invention to provide an airbag module with a design which enables an efficient use of the available space and which comprises furthermore a high stiffness.

According to the invention it is suggested that the airbag module comprises a metallic bracket with a U-shaped cross section, which embraces the folded or rolled airbag, and which comprises at least to attachment points for an attachment of the airbag module at two distanced attachment points at a vehicle fixed structure wherein the metallic bracket is designed to be attached with facing the open space between two opposing legs of the U-shaped cross section towards the interior of the vehicle.

The metallic bracket itself comprises a very high stiffness without increasing the necessary space for mounting the airbag module. Furthermore the metallic bracket is used for the attachment of the airbag module at the vehicle fixed structure, which is reasonable with respect to a stiff attachment of the airbag module. Additional attachment elements are not needed. Because of the U-shape of the metallic bracket, the folded or rolled airbag is fixed in the folded state perpendicular to the legs of the metallic bracket. The metallic bracket may be used further to attach a gas generator at the airbag module and furthermore to attach the whole airbag module at a third attachment point at the vehicle fixed structure for example via studs or screws. The metallic bracket got therefore several functions. It stiffens the airbag module without increasing the size of the airbag module. Furthermore it provides attachment points to fix the airbag module at a vehicle fixed structure and furthermore it fixes the airbag in the folded or rolled compressed state. As the metallic bracket is further designed to be attached with facing the open space between two opposing legs of the U-shaped cross section towards the interior of the vehicle, the metallic bracket itself does not need to be deformed or changes its geometry while the airbag is inflated. The airbag may inflate through the open space between the opposing legs directly into the interior of the vehicle compartment. Furthermore the U-shape bracket may be used therefore as a supporting surface for the airbag during the inflation, so that the airbag module may be attached at any part of the vehicle structure as long as the metallic bracket may be fixed. Furthermore the direction in which the airbag is inflated is defined at least at an initial stage by the direction of the opposing legs and the position and geometry of the open space between the opposing legs.

BRIEF DESCRIPTION OF THE DRAWINGS

In the following the invention shall be illustrated on the basis of preferred embodiments with reference to the accompanying drawings, wherein.

DETAILED DESCRIPTION

Figure 1A:
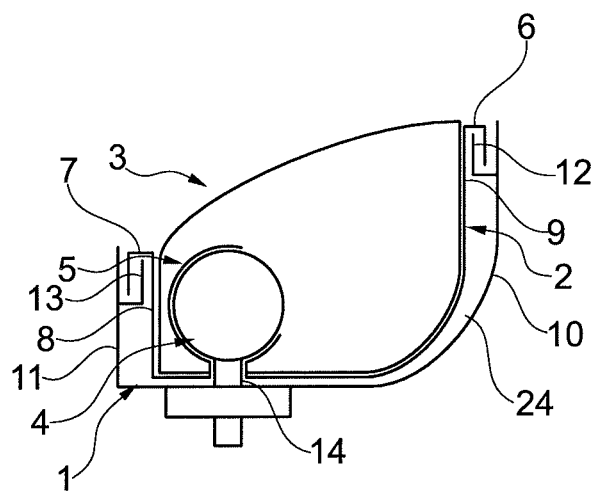
FIGS. 1A and 1B show an airbag module and a section of a seat frame in cross-section isometric view.
Figure 1B:
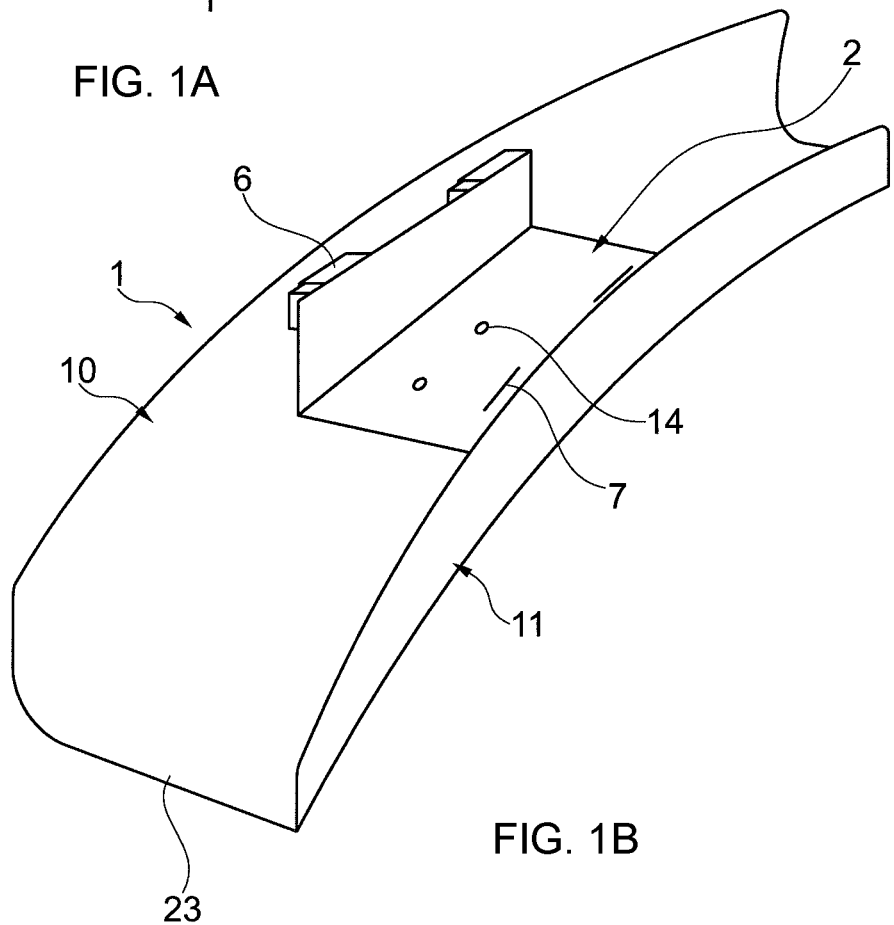

In FIGS. 1A and 1B it is shown a section of a vehicle seat frame 1 made of resin with a cavity 23 in form of a channel with two parallel upstanding walls 10 and 11. The seat frame 1 can be made of a resin like CFRP or GRP or a pure resin which comprises a very high stiffness in relation to its specific weight and can be formed in very complex geometries.

In the shown embodiment the cavity 23 has a long curved shape and is sidewise limited by the upstanding walls 10 and 11. The upstanding wall 10 is dimensioned in upright direction with a greater length than the opposing upstanding wall 11. In the cavity 23 of the vehicle seat frame 1 a metallic bracket 2 is mounted via studs or screws in holes 14. The metallic bracket 2 embraces a folded airbag 3 and a gas generator 4 and is designed in cross-section as a U-shaped metal sheet with two opposing legs 8 and 9, which comprise a length in upright direction which is at least approximately identical with the length of the upright standing walls 10 and 11 of the cavity 23. The metallic bracket 2 is formed at the end of the legs 8 and 9 in hooks 6 and 7 with which the metallic bracket 2 is fixed on corresponding flanges 12 and 13 at the seat frame 1. The seat frame 1 is in this embodiment a vehicle fixed structure at which the airbag module is mounted. The suggested airbag module may also be mounted on other vehicle fixed structures like structure parts of the vehicle body, instrument panels or the like which are preferably made of resin, and where the stiffening of the attachment of the airbag module by a metallic bracket is reasonable. The opposing legs 8 and 9 of the U-shaped bracket are directed towards the interior of the vehicle interior compartment, so that the open space between the opposing legs 8 and 9 is also facing towards the interior of the vehicle compartment. The airbag may be inflated therefore directly through the open space between the opposing legs 8 and 9 towards the interior of the vehicle compartment without deforming one of the opposing legs 8 or 9. The advantage can be seen therein that the airbag may be inflated with less resistance as possible, wherein the two opposing legs 8 and 9 are defining also the inflation direction at least at the beginning.

The hooks 6 and 7 provide distanced attachment points of the metallic bracket and the airbag module at the seat frame 1, so that the airbag module may not move out of the predetermined position. The airbag module and the embracing metallic bracket 2 are adapted in cross shape to the cross shape of the cavity 23, so that the airbag module fulfills the available space in the cavity 23 at least nearly completely. Therefore the available space in the cavity 23 is used in a very efficient manner and the airbag module is supported especially during the inflation of the airbag 3 very effective. The metallic bracket 2 is shaped in adaption to the cross-section of the cavity 23, so that there is only a very small gap with a constant or only within a limited range varying width between the metallic bracket 2 and the surface of the cavity 23 preferably of less than 20 mm.

The gas generator 4 is fixed together with a deflector 5 via screws or studs inserted through attachment holes 14 in the metallic bracket 2 at the seat frame 1, while the airbag 3 may also be fixed at the screws or studs with its rim side or with tethers for providing a special inflation characteristic.

The metallic bracket 2 is designed as a metal sheet with a flat surface without openings in these sections where the airbag 3 is abutting during the inflation, so that the airbag 3 may be stabilized and supported very efficiently also with a very thin and light metal sheet. Furthermore the metallic bracket 2 is U-shaped with one open side facing in the upper illustration of FIG. 1 towards the observer. The gas generator 4 may therefore be longer than the metallic bracket 2 in length direction and may extend in length direction over the rim of the metallic bracket 2. Furthermore the airbag 3 may therefore inflate through the open side of the metallic bracket 2 in length direction of the cavity 23. As far as the metallic bracket 2 comprises two opposing open side, like realized by the U-shape, the airbag 3 may inflate in two directions, which means in an upright orientation of the seat frame 1 in upward and downward direction.

Figures 2A, 2B:
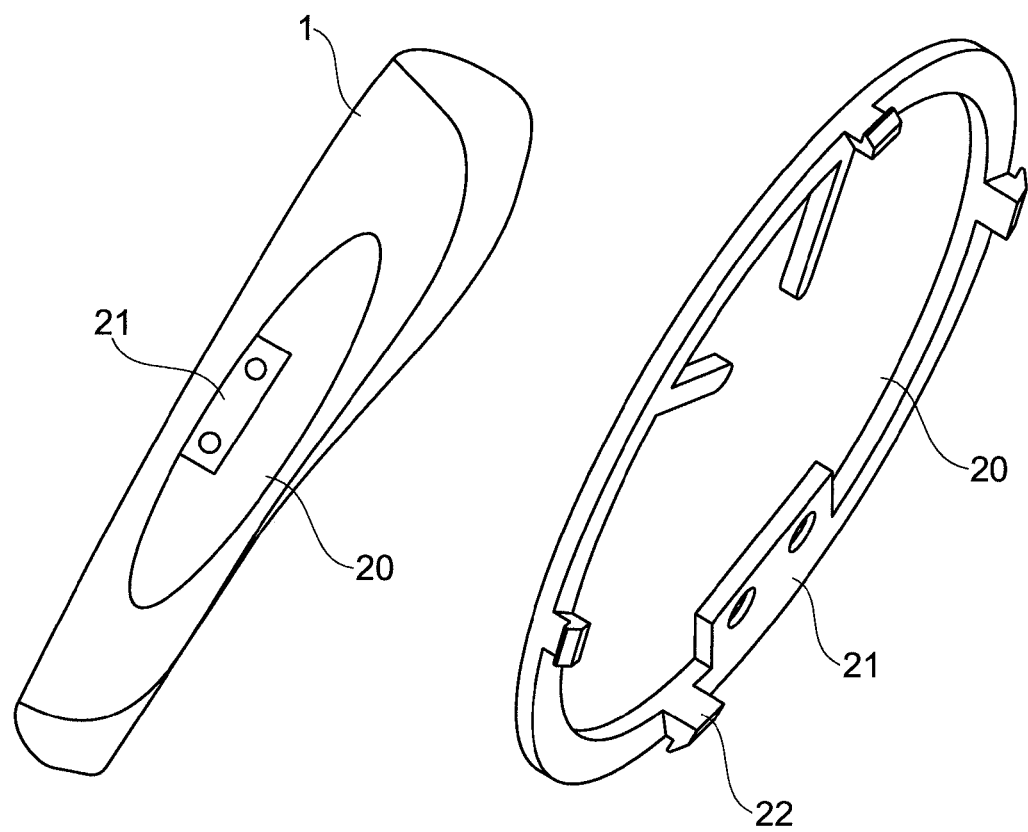
FIGS. 2A and 2B show a section of a vehicle seat with a cover of a not visible airbag module and the cover as a separate part.

In FIGS. 2A and 2B a possible embodiment for a cover 20 is shown, which comprises several resilient hooks 22. The cover 20 may be fixed with the hooks 22 directly at the seat frame 1 for example by fixing the hooks 22 at corresponding recesses at the walls 10 or 11 of the seat frame 1. The cover 20 may also comprise a connection plate 21 for fixing the gas generator 4 alternatively.

The cover 20 may be a separate part or it may also be connected with the airbag module for example with the metallic bracket 2. For this design it is important, that the covers 20 is connected or fixed at the vehicle structure by the hooks 22, to fix the cover 20 in an opening of the seat frame 1 or another vehicle fixed structure.

The invention claimed is:

1. An airbag module in combination with a vehicle structure comprising:
    an inflatable folded or rolled airbag;
    a gas generator in communication with the airbag for inflating the airbag; and
    a metallic bracket with a U-shaped cross section connected to the gas generator, the metallic bracket including at least two attachment points for an attachment of the airbag module at two distanced attachment points of the vehicle structure, the metallic bracket designed to be attached with facing an open space between first and second opposing legs of the U-shaped cross section towards an interior of the vehicle,
    wherein the vehicle structure is U-shaped including first and second walls and a floor between the first and second walls, the first and second opposing legs of the metallic bracket being generally parallel with the first and second walls of the vehicle structure, respectively,
    wherein the first leg includes at least a first hook cooperating with a first flange proximate an upper end of the first wall and the second leg includes at least a second hook cooperating with a second flange proximate an upper end of the second wall.

2. The airbag module according to claim 1, in combination with a seat frame of a vehicle, wherein the metallic bracket has a shape adapted to a closest surface of an attachment section of the vehicle fixed structure.

3. The airbag module according to claim 1, wherein the metallic bracket includes at least one open side surface.

4. The airbag module according to claim 1, wherein the first leg is longer than the second leg.

5. The airbag module according to claim 1, wherein the metallic bracket is formed at least at one rim section in a hook shaped manner for an attachment at the vehicle structure.

6. The airbag module according to claim 1, wherein the metallic bracket is made of a thin metallic sheet having at least in the sections supporting the airbag a flat structure without openings.

7. The airbag module according to claim 1, wherein the airbag module comprises a cover with hooks with which the airbag module can be attached at the vehicle structure.

8. The airbag module according to claim 1, wherein the vehicle structure is a vehicle seat frame including a resin frame with a cavity in which the airbag module is arranged, and the metallic bracket has a shape adapted to a surface of the resin frame in an area of the cavity.

9. The airbag module of claim 8, wherein the metallic bracket is shaped such that a gap between the airbag module and the resin frame of the vehicle seat is maximum 20 mm.

10. The airbag module of claim 7, wherein:
    the metallic bracket is made of a thin metallic sheet having at least in the sections supporting the airbag a flat structure without openings, and the cover is fixed with the hooks at a resin frame of the vehicle seat.

11. The airbag module of claim 1, wherein the at least first hook and at least second hook are L-shaped and include a downwardly extending portion, and the first and second flanges are L-shaped and include an upwardly extending portion.

12. The airbag module of claim 11, wherein the downwardly extending portion of the first hook is parallel to the first leg, the first wall and the upwardly extending portion of the first flange.

13. An airbag module in combination with a vehicle structure having a U-shape with first and second side walls comprising:
   an airbag;
   a gas generator for inflating the airbag;
   a metal bracket for mounting the gas generator to the vehicle structure, the metal bracket including:
      a first upwardly extending leg;
      a second upwardly extending leg;
      a first hook extending from an upper edge of the first upwardly extending leg and having a first downwardly extending portion; and
      a second hook extending from an upper edge of the second upwardly extending leg and having a second downwardly extending portion,
   a first flange extending from the first side wall and having a first upwardly extending portion disposed between the first upwardly extending leg and the first downwardly extending portion; and
   a second flange extending from the second side wall and having a second upwardly extending portion disposed between the second upwardly extending leg and the second downwardly extending portion.

14. The airbag module of claim 13, wherein the first downwardly extending portion and the first upwardly extending portion are parallel to one another and both parallel to the first leg and the first wall.

15. The airbag module of claim 14, wherein the second downwardly extending portion and the second upwardly extending portion are parallel to one another and both parallel to the first leg and the first wall.

* * * * *